(12) United States Patent  
Doree et al.

(10) Patent No.: US 11,115,878 B2  
(45) Date of Patent: Sep. 7, 2021

(54) METHOD FOR CHANGING MOBILE NETWORK

(71) Applicant: Orange, Paris (FR)

(72) Inventors: José Doree, Châtillon (FR); Jean-Claude Le Rouzic, Châtillon (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/486,786

(22) PCT Filed: Feb. 20, 2018

(86) PCT No.: PCT/FR2018/050388  
§ 371 (c)(1),  
(2) Date: Aug. 16, 2019

(87) PCT Pub. No.: WO2018/150150  
PCT Pub. Date: Aug. 23, 2018

(65) Prior Publication Data  
US 2019/0364466 A1 Nov. 28, 2019

(30) Foreign Application Priority Data  
Feb. 20, 2017 (FR) ...................... 1751329

(51) Int. Cl.  
*H04W 36/00* (2009.01)  
*H04W 8/20* (2009.01)  
(Continued)

(52) U.S. Cl.  
CPC ......... *H04W 36/0033* (2013.01); *H04W 8/20* (2013.01); *H04W 8/26* (2013.01);  
(Continued)

(58) Field of Classification Search  
CPC ............. H04L 65/1083; H04L 65/1016; H04L 67/147; H04L 67/146; H04L 65/1006;  
(Continued)

(56) References Cited

U.S. PATENT DOCUMENTS

| 8,885,603 | B2 * | 11/2014 | Keller | ................... H04W 76/10 370/331 |
| 9,294,964 | B2 * | 3/2016 | Keller | ................. H04L 65/1016 |
| 9,332,467 | B2 * | 5/2016 | Keller | ............... H04W 36/0022 |
| 9,402,212 | B2 * | 7/2016 | Mutikainen | ....... H04W 36/0022 |

(Continued)

OTHER PUBLICATIONS

International Search Report and Written Opinion dated May 11, 2018 for Application No. PCT/FR2018/050388.

*Primary Examiner* — Man U Phan  
(74) *Attorney, Agent, or Firm* — Knobbe, Martens, Olson & Bear, LLP (57) ABSTRACT

A method for changing mobile networks is described. The method may include detecting a need to switch a communication in which a terminal is participating, from a first mobile network to a second mobile network connected to the same IP network; transmission of the IMSI identifier of the terminal, by a first management center of the first mobile network to a second management center of the second mobile network; sending the IMSI identifier to the core of the IP network from the second management center; receiving a request containing the IMSI identifier by an access transfer control entity; and identifying the contact address of the terminal using the IMSI identifier. A recording server in charge of the terminal has previously obtained the IMSI identifier and sent it to the access transfer control entity.

12 Claims, 4 Drawing Sheets

(51) Int. Cl.
  *H04W 8/26*    (2009.01)
  *H04W 36/14*   (2009.01)
  *H04W 60/00*   (2009.01)

(52) U.S. Cl.
  CPC ... *H04W 36/0016* (2013.01); *H04W 36/0022* (2013.01); *H04W 36/14* (2013.01); *H04W 60/00* (2013.01)

(58) Field of Classification Search
  CPC ........ H04L 65/105; H04L 12/66; H04W 8/26; H04W 36/0016; H04W 36/0022; H04W 8/20; H04W 60/00; H04W 36/14; H04W 36/0033; H04W 36/00
  USPC .......................................... 370/221, 331, 352
  See application file for complete search history.

(56) References Cited

U.S. PATENT DOCUMENTS

| | | | |
|---|---|---|---|
| 9,860,795 B2* | 1/2018 | Mutikainen | H04W 36/0022 |
| 10,004,004 B2* | 6/2018 | Mufti | H04W 40/36 |
| 10,039,019 B2* | 7/2018 | Mufti | H04W 24/04 |
| 10,080,163 B2* | 9/2018 | Mufti | H04W 36/0022 |
| 10,694,369 B2* | 6/2020 | Park | H04L 9/006 |
| 10,721,656 B2* | 7/2020 | Mufti | H04W 36/305 |
| 2011/0238845 A1 | 9/2011 | Keller et al. | |
| 2012/0239771 A1 | 9/2012 | Rasanen | |
| 2015/0173123 A1 | 6/2015 | Luessem et al. | |
| 2016/0037390 A1 | 2/2016 | Mufti et al. | |
| 2016/0198369 A1* | 7/2016 | Keller | H04M 7/1205 370/331 |
| 2017/0339611 A1* | 11/2017 | Landais | H04W 52/0254 |
| 2017/0374599 A1* | 12/2017 | Carvalho | H04W 8/205 |

* cited by examiner

METHOD FOR CHANGING MOBILE NETWORK

RELATED APPLICATIONS

This application is the U.S. National Phase of Application No. PCT/FR2018/050388 entitled "METHOD FOR CHANGING MOBILE NETWORK" and filed Feb. 20, 2018, which claims the benefit of French Patent Application No. 1751329, filed Feb. 20, 2017, each of which is incorporated by reference in its entirety.

The present invention relates to communications networks of IP ("Internet Protocol") type, and in particular those among IP networks which are able to implement evolved session control protocols. IP networks allow the broadcasting of conversational data, within the framework of services such as "Voice over IP" (VoIP), "Content Sharing", or "Instant Messaging".

More particularly, the present invention relates to changes of mobile network on the part of a mobile terminal (for the sake of brevity, we shall simply say "terminal" hereinafter) during communication. One speaks of "switching of the communication" ("handover"), or of "access transfer", when a terminal communicates via an IP core network to which it belongs, passing firstly through a first, so-called initial, access and then through a second, so-called target, access-way to this core network (a terminal is said to "belong" to a given IP network when the user of this terminal possesses an account with the operator of this IP network, this being so irrespective of the access used by the user to connect to the IP network). This handover, which may, for example, be triggered by a degradation of the transmission quality on the initial mobile network, may relate to all or part of the media streams associated with the communication and/or of the signaling: one then speaks of total or partial transfer of the communication.

The conventional evolved session control protocols, such as the SIP protocol ("Session Initiation Protocol"), use so-called "signaling" messages, which are messages allowing a terminal to request a connection with another terminal, or also messages signaling that a telephone line is occupied, or signaling that the called telephone is ringing, or else signaling that such telephone is connected to the network and can be reached in this or that way.

The SIP protocol has been defined by the IETF (Internet Engineering Task Force) in document RFC 3261. This protocol allows the establishment, modification and termination of multimedia sessions in a network using the IP protocol. The SIP protocol was thereafter extended in particular in document RFC 3265. This extension defines event notification procedures.

It is recalled that IP network-based communication services can identify physical or virtual resources by means of character strings, for example "URI"s ("Uniform Resource Identifier"). The syntax of the URIs is defined in IETF document RFC 3986; by knowing the URI of a resource it is made possible (for example, by means of a DNS request) to obtain the IP address of an item of equipment of the network of the operator managing this resource.

In particular, in networks implementing the SIP protocol, two types of resource identifiers are distinguished: those of the form "SIP-URI" such as defined in IETF document RFC 3261, or those of the form "tel-URI" such as defined in IETF document RFC 3966. An SIP-URI is of the form "user@host" (for example, alice@domain1), where the "host" part identifies the domain of the operator responsible for the identity represented by the "user" part. A tel-URI is of the form "tel:telephone_number" (for example, tel with reference to international public telephone numbers, or of the form "tel:telephone_number;phone-context . . . " (for example, tel:0623456789;phone-context=+33) with reference to telephone numbers allocated by an operator for its private network.

This SIP protocol is used in particular in infrastructures of IMS type (initials of the English words "IP Multimedia Subsystem").

The IMS architecture was introduced by the 3GPP for mobile networks, and then taken up by TISPAN ("Telecommunications and Internet Converged Services and Protocols for Advanced Networking") for fixed networks. This architecture allows the dynamic establishment and the control of multimedia sessions between two clients as well as the reservation of resources at the multimedia streams transport network level. By virtue of this architecture, network operators can conveniently implement a management policy, provide a predetermined Quality of Service, and calculate the amounts to be billed to clients. The IMS currently makes it possible to access services of telephone, videophone, Presence and Instant Messaging type, whose interaction it also manages.

Each user of an IMS network can be identified therein by means of diverse identities, including the IMPI ("IP Multimedia Private Identity") and the IMPU ("IP Multimedia PUblic identity").

The IMPI is defined in the 3GPP specification TS 23.228. The IMPI is an identity assigned permanently by the operator of a network to a subscription with this operator, and is used, for example, for registration, authorization of access, administration of services offered to the user, and billing (it will be noted that a user may have several IMPIs within the same subscription; it is thus possible to associate each IMPI with a different terminal). The IMPI has the form of an NAI ("Network Access Identifier"), such as defined in IETF document RFC 4282. It will be noted that in most of the current mobile networks, the IMPI is derived from the IMSI (International Mobile Subscriber Identity) identifier stored in the SIM (Subscriber Identity Module) card; it is then easy to establish a correspondence between these two identities; in particular, the IMSI is, conversely, deducible from the IMPI.

A user avails themself of their IMPU to communicate with other users. The IMPU takes the form of a URI or of a short number, or else of an arbitrary alias. In a mobile network, a part of the IMPU corresponds to the user's public telephone number (i.e. to third-party usage), called MSISDN ("Mobile Station ISDN Number"); a direct correlation therefore exists between IMPU and MSISDN.

It will be noted that, for a given IMPI, there may be several IMPUs (for example, a tel-URI and an SIP-URI).

It will also be noted that an IMPU can be shared, in such a way that several terminals (for example, telephones, smartphones, or tablets) can be reached with the same public identity (for example, a single telephone number for a whole family of users). Each of these terminals is distinguished by its own private identity (IMPI). A current example of such a multi-terminal configuration is the "multi-SIM" case: a user who subscribes to this option has several SIM cards (and therefore several IMSIs), that can be reached by means of the same MSISDN public telephone number.

All these identities of a user are configured by the operator during the creation of an account with this operator, and utilized during the attachment and registration of the user on the network.

In particular, one and the same terminal, when it is "multimode", can attach itself and register with an IP core network by way of several types of mobile networks, such as a GSM (Global System for Mobile Communications) network, a UMTS (Universal Mobile Telecommunications System) network, a WiFi network (standards of IEEE group 802.11), or an LTE (Long Term Evolution) network. A multimode terminal offers its user the possibility of choosing the best possible network to establish a communication. The criteria for choosing which are applied generally pertain to the user or to the operator of the IP network: operator's tariff policy, quality of communication, available bandwidth, and so on and so forth.

Nowadays, great interest exists in respect of telephone services over LTE ("Voice over LTE", or VoLTE, in English), an also in respect of videophone services over LTE ("Video over LTE", or ViLTE, in English). Within this framework, it has been envisaged that in case of necessity, a communication can be switched from an LTE mobile network to a GSM or UMTS mobile network; such a handover is technically complex, since it is necessary in particular to ensure the continuity of a telephone call initiated in a packet-switched (PS) network and continued in a circuit-switched (CS) network.

Thus, the standards TS 23.237 (stage 2) and TS 24.237 (stage 3) of the 3GPP (Third Generation Partnership Project) define access transfer mechanisms for a handover from an LTE network to a GSM or UMTS network, and offer operators wishing to implement such access transfers two types of procedures. The first type is called "SRVCC" ("Single Radio Voice Call Continuity"). The second type is called "eSRVCC" ("enhanced Single Radio Voice Call Continuity"). These two types of procedures use a dedicated application server (AS), called SCC-AS ("Service Centralization and Continuity"), to manage the signaling received on the part of the terminals at the moment of the handover.

The eSRVCC procedure in particular uses, in addition to the SCC-AS, entities called ATCF ("Access Transfer Control Function") and ATGW ("Access Transfer Gateway"), which are placed on the segment for access to the core network. The signaling is anchored in the ATCF, and the media stream is anchored in the ATGW. This anchor is not modified during access transfer, so that the SCC-AS does not need to indicate to the remote terminal a modification of the media stream. This second procedure makes it possible to reduce the cutoff times of the voice communication at the moment of the access transfer with respect to a procedure of SRVCC type, since the eSRVCC procedure intervenes on the media streams as close as possible to the user for whom it is triggered, whilst the SRVCC procedure requires a complete renegotiation between the two users involved in the communication. The benefit of eSRVCC with respect to SRVCC, in addition to decreasing the number of signaling exchanges, is therefore the ability to switch the media streams as close as possible to the user who is changing network, so that media interruption is as short as possible.

The choice of the procedure to be applied rests upon the analysis by the SCC-AS of the media stream's characteristics such as transmitted in the signaling during the transfer: if the media stream is not modified, the eSRVCC procedure can be applied; if the media stream is modified, the SRVCC procedure must be applied.

In both architectures (i.e. SRVCC and eSRVCC), when transferring access to the circuit domain, the identifier of the user transmitted to the SCC-AS or to the ATCF is the MSISDN public telephone number. However, in the case of a multi-terminal subscription, during the access transfer of one of these terminals, it is not possible to determine which terminal of the set of the subscriber's terminals has changed mobile network, since the only identifier transmitted by the circuit domain is the MSISDN, which is, as explained hereinabove, associated with the user's public identity. Stated otherwise, when a user has several terminals sharing the same public identity, it is impossible to know, if relevant, which of these terminals has participated in an access transfer procedure.

It is possible to consult in this regard application US 2011238845, which relates to the session transfer techniques implemented by an SCC-AS entity in an IMS domain. Said SCC-AS entity comprises means for:

registering, for each of a plurality of ongoing communication sessions, a session information element comprising a user identity identifying a terminal participating in the session and a first identifier of the terminal in a CS domain of the communication network, said user identity being associated with a plurality of terminals and said first identifier comprising at least one MSISDN, an IMSI or a GRUU (Globally Routable Unique User), receiving a session transfer request, said session transfer request asking for the transfer of a session associated with a second device identifier included in the request, the second device identifier identifying a terminal in the CS domain and comprising at least a MSISDN, an IMSI or a GRUU, comparing the second received device identifier with the plurality of first registered device identifiers, and identifying, on the basis of this comparison, a particular ongoing session to which the session transfer request received pertains.

This application US 2011238845 specifies however that, in order that the SCC-AS entity can identify the session to be transferred, the MSISDN of the terminal in the CS domain must not be shared by a plurality of terminals in the IMS domain. Moreover, this application relates to the transfer of a calling terminal, and does not teach how to identify a particular terminal which is the subject of a transfer from among a plurality of called terminals.

In the prior art, the handover of a communication in which a terminal forming part of a set of several mobile terminals participates is therefore not possible: any attempt to implement an SRVCC procedure or an e-SRVCC procedure is deemed to fail, being unable to identify the terminal involved in the handover.

The present invention therefore relates, according to a first aspect, to a method for changing mobile network, comprising the following steps:

detection that it becomes necessary to switch a communication in which a terminal from a first mobile network connected to an IP network participates, to a second mobile network connected to the same IP network, transmission by a first management center belonging to said first mobile network to a second management center belonging to said second mobile network of the IMSI identifier of said terminal, sending of said IMSI identifier to the IP core network by said second management center, reception by an access transfer control entity of a request for change of mobile network containing said IMSI identifier, and identification of the contact address of the terminal by said access transfer control entity by means of the IMSI identifier.

Said method is noteworthy in that, during the registration of said terminal with said IP network, a registration server in charge of the terminal has obtained said IMSI identifier and has forwarded it to said access transfer control entity.

Thus, the invention proposes the modification:
- of the conventional procedure executed for a terminal during its registration on an IP network, and
- of the conventional identification procedures executed by the access transfer control entities.

It will be noted that the IP network to which the invention applies may be not only an IMS network, but also any IP network compatible with access transfer procedures analogous to the SRVCC and eSRVCC procedures.

It will also be noted that the modified registration procedure according to the invention is in particular applicable in the case of a multi-terminal configuration. Indeed, the identification of a terminal (calling or called) forming the subject of a change of mobile network from among a plurality of terminals belonging to the same user can be carried out by simple consultation of the list, thus constructed, of the IMSI identifiers of these terminals.

By virtue of these provisions, an access transfer control entity in charge of the user can unambiguously identify a terminal of this user involved in a change of mobile network. Thus, in particular, the success of the access transfers is ensured in a multi-terminal subscription situation.

According to particular characteristics, after having obtained said IMSI identifier, said registration server forwards it to an SCC-AS entity.

According to still more particular characteristics, after having received said IMSI identifier, said SCC-AS entity transmits it to an ATCF entity.

According to other particular characteristics, after having obtained said IMSI identifier, said registration server forwards it to an ATCF entity.

By virtue of these provisions, at least one of the access transfer control entities (SCC-AS and/or ATCF) in charge of the user can, in the case of a multi-terminal configuration, be informed of the IMSI identifier of each of this user's terminals. This access transfer control entity will therefore readily be able to identify the contact address of one of these terminals which would thereafter form the subject of a change of mobile network.

According to a second aspect, the invention relates to diverse devices.

It thus relates, firstly, to a registration server in an IP network, comprising means for, during the registration with said IP network of a terminal under the charge of said registration server, obtaining the IMSI identifier of said terminal and forwarding it to an access transfer control entity.

The invention also relates, secondly, to an access transfer control entity in an IP network consisting of an SCC-AS entity, and comprising means for receiving on the part of a registration server, and registering, the IMSI identifier of a terminal.

According to particular characteristics, this access transfer control entity furthermore comprises means for transmitting the IMSI identifier of a terminal to an ATCF entity.

The invention also relates, thirdly, to an access transfer control entity in an IP network consisting of an ATCF entity, and comprising means for receiving on the part on the part of a registration server or of an SCC-AS entity, and registering, the IMSI identifier of a terminal.

According to particular characteristics, any one of the access transfer control entities described succinctly hereinabove furthermore comprises means for:

- receiving a request for change of mobile network relating to a terminal, said request containing the IMSI identifier of said terminal, and
- identifying the contact address of the terminal by means of said IMSI identifier.

The advantages offered by these devices are essentially the same as those offered by the methods succinctly set forth hereinabove.

According to a third aspect, the invention relates to a communication system in an IP network, comprising:
- at least one registration server such as described succinctly hereinabove, and
- at least one access transfer control entity such as described succinctly hereinabove.

The advantages offered by this communication system are essentially the same as those offered by the methods succinctly set forth hereinabove.

The invention also envisages a computer program downloadable from a communication network and/or stored on a medium readable by computer and/or executable by a microprocessor. This computer program is noteworthy in that it comprises instructions for managing the operation of a registration server such as described succinctly hereinabove, or of an access transfer control entity such as described succinctly hereinabove, when it is executed on a computer.

The advantages offered by this computer program are essentially the same as those offered by said method.

Other aspects and advantages of the invention will become apparent on reading the description detailed hereinbelow of particular embodiments, given by way of non-limiting examples. The description refers to the figures which accompany it, in which.

The SRVCC and eSRVCC procedures being designed to operate preferably with IP networks of IMS type, we shall begin with a few reminders relating to this type of network.

When a user wishes to benefit from the services offered by an IMS network, he/she dispatches signaling messages to the network which could include in particular diverse types of requests.

Firstly, the user's client device must, apart from exceptions (such as certain emergency calls), register on the network by sending it a request called "SIP REGISTER". When the network is incapable of ascertaining any link between this registration and a previous registration (for example following a network fault, or following a shutdown of the client device for a duration greater than a predetermined value), the registration is considered to be an initial registration. After an initial registration, the user's client device must periodically send a request to the network to confirm that it wishes to maintain its registration.

To be able to register the client devices, IMS networks comprise one or more registration servers, called "S-CSCF"s ("Serving-Call Server Control Function"), which are able (among other functions) to manage the procedure for registration of the devices connected to the network.

IMS networks furthermore comprise one or more interrogation servers, called "I-CSCF"s ("Interrogating-Call Server Control Function")—otherwise often combined physically with the S-CSCF registration servers so as to constitute call servers denoted "I/S-CSCF"—which, at the moment of registration of a client device, interrogate a subscriber data server called "HSS" ("Home Subscriber Server"), so as to be able to select an S-CSCF server possessing the characteristics which are necessarily (and, if relevant, optionally) required in order to attain the level of service subscribed to by the user. The HSS servers each contain a client database, and are therefore the equivalent in IP networks of the "HLR" servers (initials of the English words "Home Location Register") used in GSM networks. Each HSS server contains the IMS subscriptions of the subscribers of the operator as well as their service profiles. In particular, the specification TS 29.228 (Section B.1 and figure B.1.1 in particular) of the 3GPP makes provision to be able to supply in the subscription of the user of a mobile terminal, the IMSI of the terminal in the same regard as the private identity thereof.

IMS networks furthermore comprise:

a (or several) voice messaging server(s): a voice messaging server manages the subscription of the client device to the posting/consultation events in respect of the messages of the user of this client device, and notifies the client device upon the occurrence of these events;

a (or several) presence server(s): a presence server manages the subscription of the client device to the presence events that the user of this client device wishes to monitor, and notifies the client device upon the occurrence of these events; and a (or several) telephone server(s): a telephone server manages the telephone services to which the user of the client device has subscribed through his/her operator, such as number display or call diversion.

Voice messaging servers, presence servers and telephone servers are examples of what are called "application servers" (AS).

The S-CSCF server which has been allocated to the user authenticates this user, and thereafter downloads the user profile from the HSS server. This profile contains information on the services to which this user is entitled. The information is stored in the form of "initial Filter Criteria" ("iFC). The S-CSCF then sends a message called "third party registration" to all the application servers. The body of this message contains service information in the XML language and/or the original SIP REGISTER request and/or the 200 OK response to the original SIP REGISTER request. The aim of the third party registration is to let the application servers know that this user is available on the network (for example, the TAS will stop transferring the calls intended for this user to his Voicemail Box).

The user can then make use of said services during the ongoing session. This may for example entail services offered automatically to all the users of the IMS network. This may also entail services to which this user has subscribed through the operator of the network, and which are placed at his disposal automatically. Finally, this may entail services which the user can make use of after having dispatched an appropriate request (SIP SUBSCRIBE). These services comprise audiovisual applications such as those mentioned hereinabove. It may also entail a subscription to the state of a resource, in which case event notifications (SIP NOTIFY) are sent to the client device as soon as the state of the resource changes.

IMS networks furthermore comprise one or more servers called "P-CSCF" ("Proxy-Call Server Control Function"). For each client device connected to an IMS network, there exists a P-CSCF server serving as linkup entity between the IMS core network and the mobile network used by this client device; thus, all the SIP signaling exchanged between the client device on the one hand, and the I-CSCF interrogation server or the S-CSCF registration server on the other hand, passes through the P-CSCF server.

Finally, IMS networks comprise media gateways, such as the IMS-AGW (IMS Access Gateway). A "media gateway" is an entity responsible, under the control of a P-CSCF server, for opening and closing the gates between the mobile network and the core network from the media standpoint; the "media gateway" entity is also in charge of the traffic policing, as well as the marking of the media streams from the Quality of Service standpoint.

As regards mobile networks that can interconnect with an IMS network, we shall be concerned hereinbelow with CS networks of GSM or UMTS type, and with PS networks of LTE type.

It is recalled that CS networks comprise in particular:

one or more base stations (called "Node B" in UMTS); and one or more management centers, called "MSC" (Mobile Switching Center); an MSC management center is generally associated with a media gateway MGW situated at the boundary between the CS mobile network and the IMS network; the point of access in the IMS core network is an I-CSCF server.

PS networks comprise in particular:

one or more base stations, called "eNode B";

at least one MME (Mobility Management Entity) management center; an MME management center is generally associated with a media gateway PGW (PDN Gateway) situated at the boundary between the CS mobile network and the IMS network; the access point in the IMS core network is a P-CSCF server;

at least one gateway SGW (Serving Gateway): the SGW routes and transmits the user data packets, and also acts as mobility anchor point for the user data during transfers between base stations eNode B, and also as anchor point during transfers between an LTE network and a network implementing another 3GPP technology; and at least one PGW gateway, mentioned hereinabove: the PGW provides the connectivity between the UE and the external packet data networks (PDNs) by serving as traffic entry and exit point for the UE; a mobile terminal can be connected simultaneously to several PGWs to have access to several PDNs; the PGW ensures the execution of the network policy, packet filtering for each user, imputation assistance, legal interception and packet sniffing.

The changes of mobile network that are considered hereinbelow comprise in particular the handover of a communication from an MME management center of the LTE network to an MSC management center of the GSM or UMTS network.

We shall now describe the SRVCC procedure, perusing the articles by Frédéric Launay entitled "SRVCC-Single Radio Voice Call Continuity" (available on http://blogs.univ-poitiers.fr/f-launay/2015/06/24/srvcc-single-radio-voice-call-continuity/) and "SRVCC-Single Radio Voice Call Continuity-Suite" (available on http://blogs.univ-poitiers.fr/f-launay/tag/esrvcc/).

Figure 1:
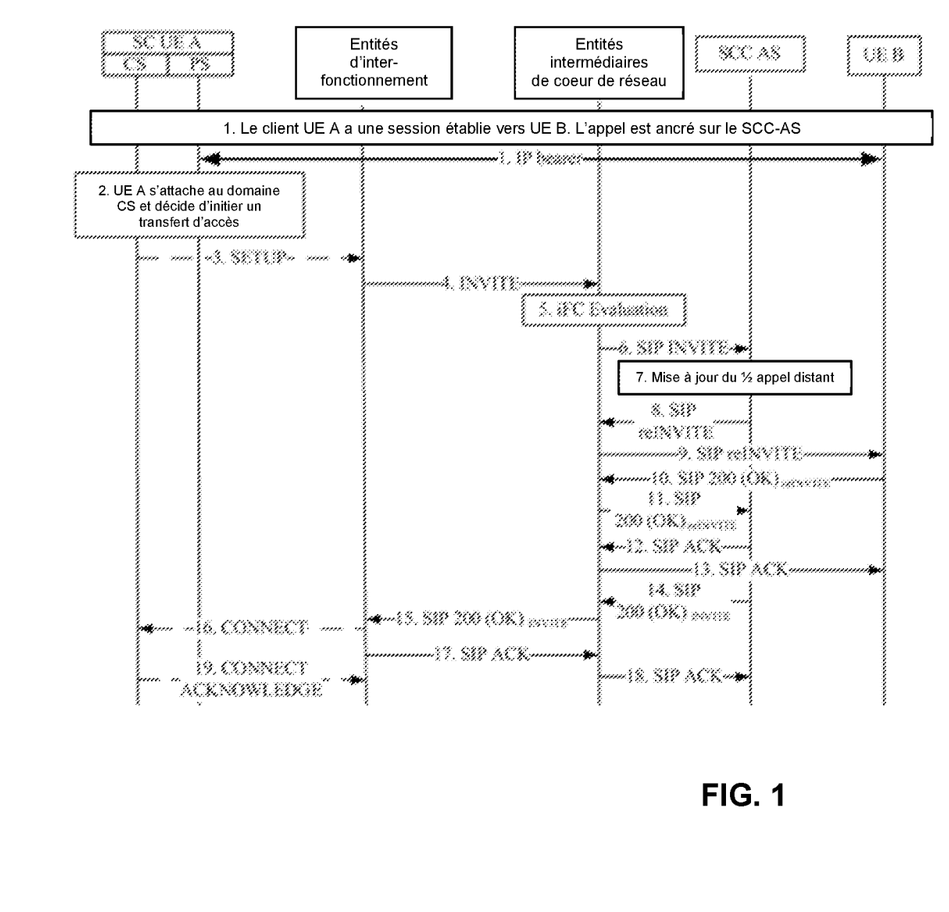
FIG. 1 illustrates the steps implemented conventionally in the SRVCC procedure.

FIG. 1 (adapted from the 3GPP specification TS 24.237, section A.6.2) summarizes the conventional protocol exchanges of the SRVCC procedure between, on the one hand, the CS domain (equipment designated "Interworking entities" in the figure), and on the other hand the IMS network elements.

In IMS networks, when a client device UE A dispatches a call to a client device UE B, or receives a call from a client device UE B, an SIP INVITE call request is transmitted to an S-CSCF server; the execution of the associated task (diversion of the request to an Application Server) depends on the subscriber's subscription rules, and this task is performed by applying the list of rules defined on the basis of the parameters of the above-mentioned filter iFC to the call.

Prior to the SRVCC procedure, the call has been anchored by the above-mentioned SCC-AS server, as illustrated in step 1 of FIG. 1 (when a call travels through an SCC-AS, it is said to be "anchored" by the SCC-AS). More precisely, considered from the side of the client device UE A from which the call originates, the call will be transmitted firstly to the SCC-AS before being processed by the Telephony Application Server (TAS); considered from the side of the client device UE B for which the call is destined, the call is firstly transmitted to the TAS, which transfers it thereafter to the SCC-AS.

When the base station eNode B to which the client device UE A is connected detects that the signal received by this client device UE A is weak (step 2), the MME responsible for this client device UE A sends a request for switching to the CS network (step 3). Accordingly, the MME must be able to:
separate the Data stream (PS) from the Voice stream (managed by the CS mode after handover),
manage the handover of the non-Voice PS virtual channels ("bearers") to the target network, and
initiate the SRVCC handover procedure by relying on the Voice bearer.

An interface, named "Sv", between the MSC and the MME allows the MME to:
ask the MSC to reserve radio resources at the CS radio access interface level; the MSC is therefore responsible for the reservation of resources for call continuity; and
give the MSC an identifier of the SCC-AS so that the MSC can dispatch to the SCC-AS an INVITE request for handover for the account of the client device UE A.

During registration of the client device with the IMS network, the MME recovered an identifier called "STN-SR" ("Session Transfer Number for SRVCC") on the part of the HSS server (which has itself received it from the SCC-AS). This is a number in the telephone format E.164. It is this identifier of the SCC-AS which is transmitted by the MME to the MSC so that the latter can dispatch said request for handover to the SCC-AS.

The MSC then dispatches to the IMS network an SIP INVITE request for transfer of an active session, comprising said STN-SR number as well as the MSISDN public telephone number of the user of the client device UE A (step 4).

The SCC-AS thereafter receives said INVITE request (step 6), and takes charge of the session transfer. From this moment, the MME can ask the client device UE A to switch to the GSM or UMTS network. The SCC-AS informs the client UE B of the access transfer for taking account of the new media streams to the MSC (steps 7 to 13). After the switching, the SCC-AS sends confirmation of the success of the procedure to the MSC (steps 14 and 15).

We shall now describe the conventional eSRVCC procedure, perusing the article "Mind the coverage hole!" (available on the site https://realtimecommunication.wordpress.com/2015/03/24/mind-the-coverage-hole/#more-380).

The conventional eSRVCC procedure is described in specifications GSMA IR.64, as well as TS 23.237 and TS 24.237 of the 3GPP. The architecture used in this procedure is illustrated schematically in FIG. 2*a*.

Figure 2A:
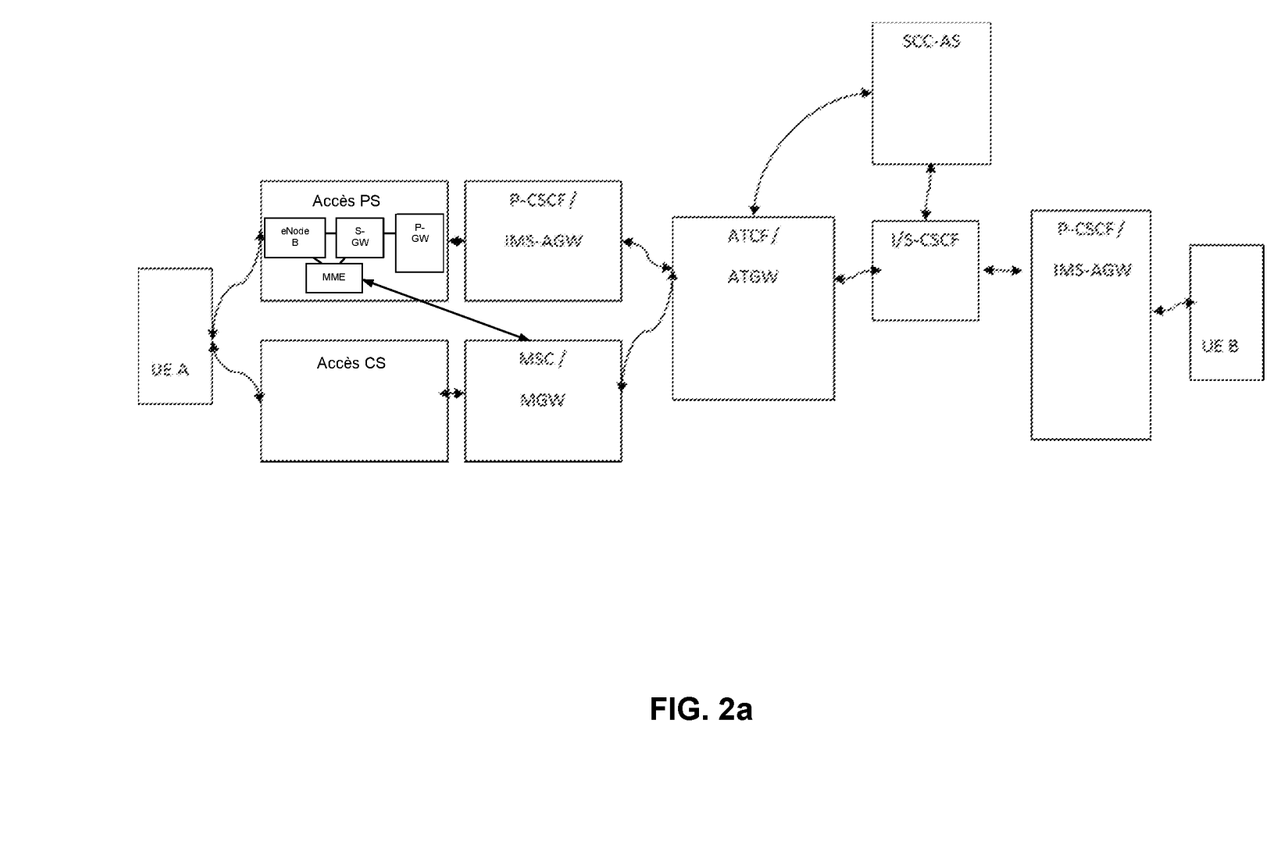
FIG. 2a schematically represents a network architecture used conventionally for the eSRVCC procedure.

As mentioned above, the eSRVCC architecture comprises two entities intended to serve as anchor points on the segment for access to the core network. These entities are as follows:
the ATCF acts as anchor point for the SIP signaling, and is placed in the SIP signaling path between a P-SCSF and an S-CSCF; each ATCF is identified by an STN-SR number; the SCC-AS receives the STN-SR of the ATCF in charge of a subscriber at the moment of registration of the subscriber, and then it transmits it to the HSS; the HSS transmits it in its turn to the MME (as within the framework of the SRVCC procedure described succinctly above); and
the ATGW acts as anchor point for the media stream; the ATGW is controlled by the ATCF; the ATGW is often co-located with an IMS-AGW media gateway.

Figure 2B:
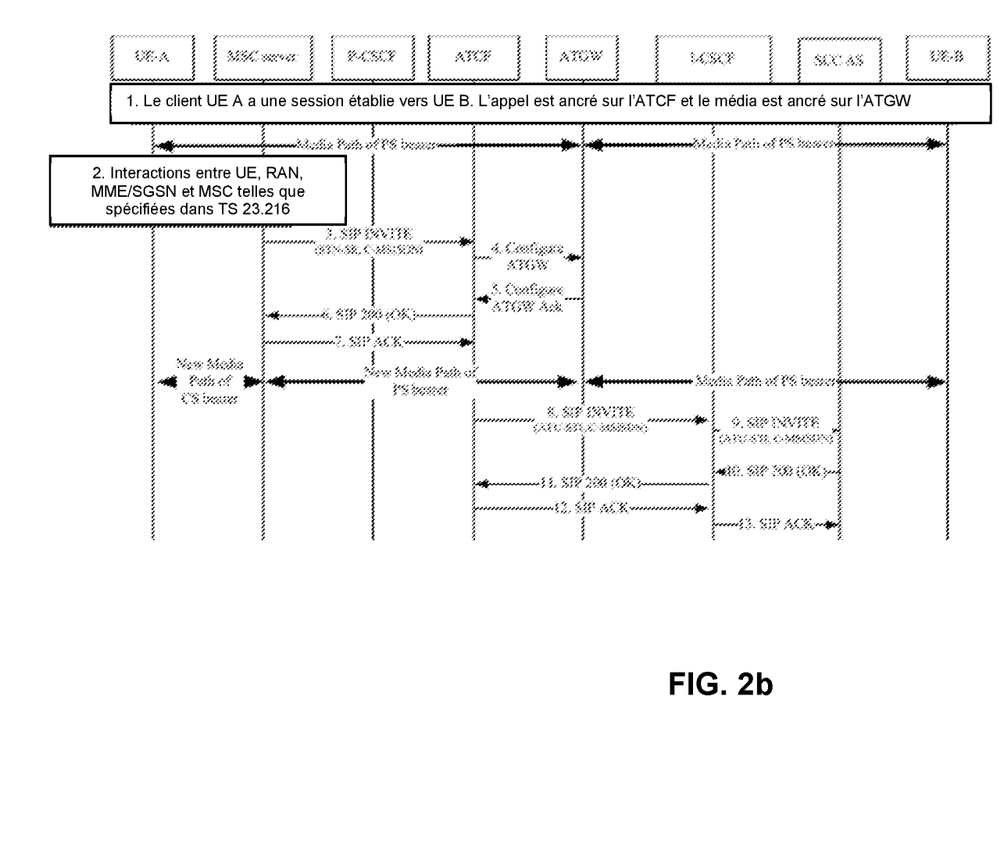
FIG. 2b illustrates the steps implemented conventionally in the eSRVCC procedure.

FIG. 2*b* (adapted from the 3GPP specification TS 24.237, Section A.18.3) summarizes the conventional protocol exchanges of the eSRVCC procedure between the CS domain and the IMS network elements.

As explained above, when a mobile terminal registers on an IMS network, it dispatches an SIP REGISTER request, which is received by a P-CSCF server. According to the eSRVCC procedure, this P-CSCF server transmits the SIP REGISTER request to the ATCF. If the mobile terminal's home network is compatible with the eSRVCC procedure, the ATCF decides, as a function of the operator's policy, whether or not to anchor the SIP signaling.

If it decides to anchor the signaling, the ATCF enriches the initial SIP REGISTER request, in particular by including itself for sessions created on the basis of the present registration, and by adding its URI (called ATCF-URI) in the signaling path.

The SIP REGISTER request thus enriched is thereafter transmitted by the ATCF to the I-CSCF server, which transmits it to the S-CSCF, then the S-CSCF sends the SCC-AS a message containing the initial SIP REGISTER request in the message body. The SCC-AS takes into account the STN-SR number of the ATCF, and updates the HSS server. The SCC-AS thereafter sends to the ATCF, in the message body of a request according to the SIP MESSAGE method (described in IETF document RFC 3428):
the MSISDN public telephone number of the user of the client device UE A, and
the URI of the SCC-AS, called ATU-STI (initials of the English words "Access Transfer Update—Session Transfer Identifier").

Once registered, the client device UE A can establish a communication PS with a client device UE B (step 1 of FIG. 2*b*).

When the base station eNode B to which the client device UE A is connected detects that the signal received by this client device UE A is weak, the MME responsible for this client device UE A sends a request for handover to the CS network (step 2). The request contains in particular the STN-SR number of the ATCF, as well as the user's MSISDN telephone number. The MSC/MGCF produces an SIP INVITE request comprising this STN-SR number as well as this MSISDN number, and sends it to the ATCF (step 3).

The ATCF finds the user's MSISDN number in the "P-Asserted-Identity" field of the INVITE request received, and asks the ATGW for the media stream modifications required (steps 4 and 5). Next, by means of the ATU-STI (mentioned hereinabove), the ATCF sends the SCC-AS a new SIP INVITE request reproducing the "Target-Dialog" header identifying the dialog established by the INVITE request before the handover (steps 8 and 9).

It will be noted that, in the SRVCC and eSRVCC procedures described succinctly hereinabove, the only identifier transmitted by the CS domain to the IMS core network (cf. step 4 of FIG. 1, or step 3 of FIG. 2*b*) is the user's MSISDN public telephone number. As explained hereinabove, it follows from this that, in the prior art, when the user has several terminals sharing the same public identity, it is not possible on the basis of this public identity to determine the private identity of the terminal that participated in an access transfer procedure.

We shall now describe embodiments of the invention, in which the network considered will be of IMS type, such as described succinctly hereinabove.

In these embodiments, the IMSI identifier will preferably be delivered to the relevant elements of the network by means of a dedicated SIP header, that will be called "P-Associated-IMSI". It will be possible to have for example:

P-Associated-IMSI: 208010123456789.

In fact, a header making it possible to provide the IMSI identifier is already known, but this header is used within the framework of a very specific restoration function in case of error: this is the "Restoration-Info" header defined in 3GPP specification TS 24.229, Section 7.2.11. Hence, the definition of a new header is preferred so as not to confuse the various usages; however, a new use of the Restoration-Info header for the purposes of the present invention is also possible.

Moreover, these embodiments introduce modifications with respect to the conventional procedure for registering a terminal on an IMS network, as will now be explained.

A first embodiment relates to a modified eSRVCC procedure.

Figure 3:
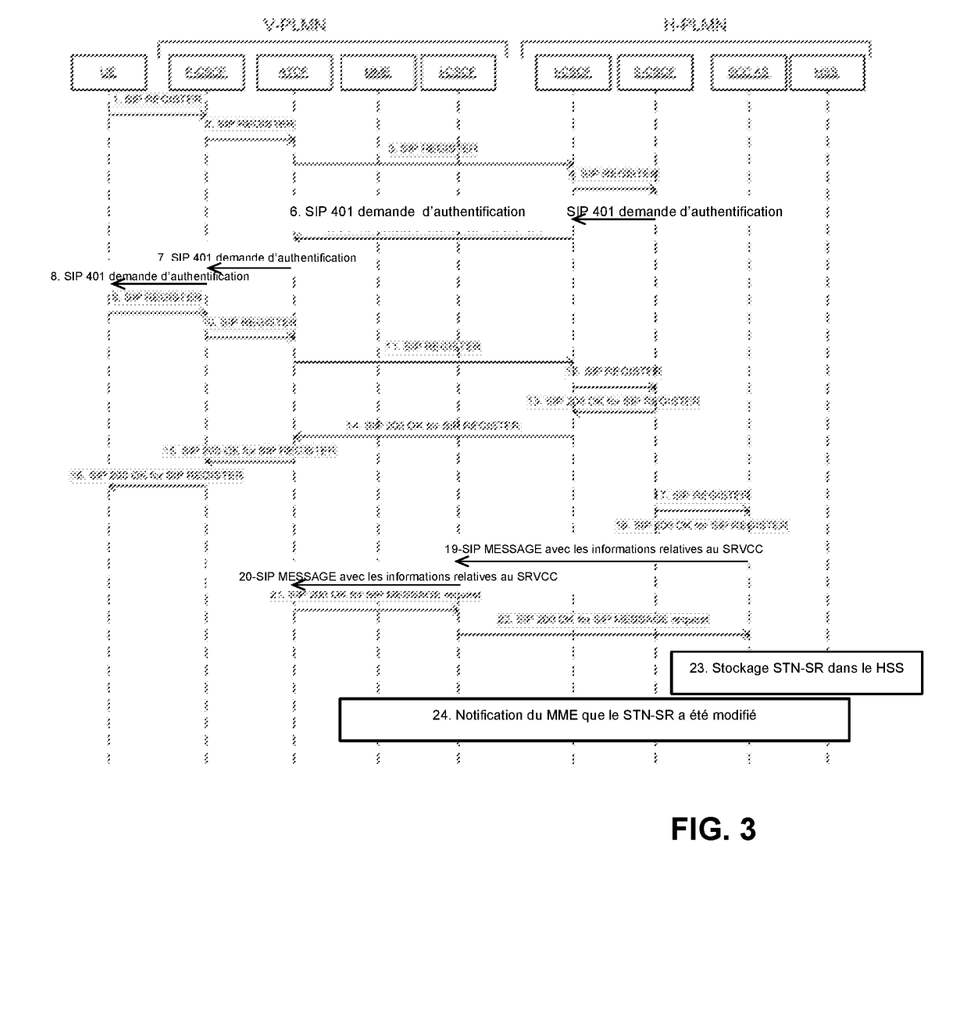
FIG. 3 illustrates the steps implemented conventionally in the course of a registration in the eSRVCC procedure.

The conventional procedure for registering a terminal with an IMS core network is illustrated in FIG. 3 (adapted from 3GPP specification TS 24.237, Section A.3.3). In this instance, the terminal is in roaming situation; it therefore registers from a visited network (V-PLMN, for Visited-Public Land Mobile Network) in the user's home network (H-PLMN, for Home-Public Land Mobile Network); the entities (P-CSCF, ATCF) of the visited network transmit the registration requests to the entities (I-CSCF, S-CSCF, SCC-AS, HSS) of the user's home network.

Firstly, the S-CSCF server in charge of the user obtains the IMSI identifier of the terminal that is registering.

According to a first variant, the S-CSCF server deduces the IMSI identifier from the private identity IMPI.

According to a second variant, in accordance with IETF document RFC 4740, following step 12 of FIG. 3 (reception of an "SIP REGISTER" request by the S-CSCF server), the following sub-steps (not represented in FIG. 3) take place:

the S-CSCF server sends the HSS server an SAR (Server-Assignment-Request) DIAMETER message in which it indicates, in particular, its name in conjunction with the private identity IMPI of the user that it has taken charge of; and the S-CSCF server receives on the part of the HSS server, in an SAA (Server-Assignment-Answer) DIAMETER response, further data relating to the user undergoing registration (such as complementary identities, or the user profile); the HSS server also provides in this SAA response (and more precisely in the "User-Profile" object of this SAA response, as specified in Section B1, mentioned hereinabove, of the standard TS 29.228) the IMSI identifier if the latter is available.

The S-CSCF server will henceforth be able to provide the IMSI identifier to the elements of the network that need it.

For example, in accordance with step 13 of FIG. 3, provision is conventionally made for the S-CSCF server to dispatch an SIP 200 OK response to the I-CSCF server of the home network. In the present embodiment, the S-CSCF can insert thereinto a P-Associated-IMSI (or Restoration-Info) header containing the IMSI identifier. Thus, in step 14 of FIG. 3 (transmission of the SIP 200 OK to the ATCF), the ATCF will have the IMSI identifier at its disposal; the ATCF will then be able to broadcast this item of information in the registration context associated with the user.

As another example, in step 17 of FIG. 3, provision is conventionally made for the S-CSCF server to transmit the SIP REGISTER request to the SCC-AS. In the present embodiment, the S-CSCF server can insert thereinto a P-Associated-IMSI (or Restoration-Info) header containing the IMSI identifier. The SCC-AS is thus informed of the IMSI identifier of the terminal that is registering, and will then be able to broadcast this item of information in the user's registration context. For example, during the dispatch of the SIP MESSAGE request (steps 19 and 20 of FIG. 3) to the ATCF, the SCC-AS server will be able to insert the IMSI identifier into the body of this request or into a P-Associated-IMSI (or Restoration-Info) header of this request.

The SCC-AS and the ATCF then have at their disposal, in the registration context of the terminal that has just registered, all of the terminal's "non-barred" public identities (that is to say those that are usable by the terminal to establish calls), the contact address of the terminal, and its IMSI identifier.

A second embodiment relates to a modified SRVCC procedure.

The modifications with respect to conventional registration are analogous to those described hereinabove with reference to the first embodiment. It is recalled that the SRVCC architecture does not comprise any ATCF entity; consequently, steps 19 to 24 of FIG. 3 do not exist.

Firstly, the S-CSCF server in charge of the user obtains the IMSI identifier of the terminal that is registering as described hereinabove within the framework of the first embodiment.

The S-CSCF server can henceforth provide the IMSI identifier to the elements of the network that need it.

For example, the S-CSCF server dispatches an SIP 200 OK response to the I-CSCF server of the home network, into which the S-CSCF server inserts a P-Associated-IMSI (or Restoration-Info) header containing the IMSI identifier. The I-CSCF server will then be able to transmit this SIP 200 OK response to the P-CSCF server in charge of the terminal that is registering. The knowledge by the P-CSCF server of the IMSI identifier of a terminal may be in particular useful when this terminal is in roaming situation, as illustrated in FIG. 3. Moreover, the P-CSCF server may, in the case of a multi-terminal configuration, generate a call report ("Call Detail Record", or CDR) and/or statistics relating to a particular terminal (identified by its IMSI identifier) of the set of terminals; it is then possible to distinguish each of the user's terminals at the level of the network operator's information and billing systems.

As another example, when the S-CSCF server transmits the SIP REGISTER request to the SCC-AS, the S-CSCF server can insert thereinto a P-Associated-IMSI (or Restoration-Info) header containing the IMSI identifier. The SCC-AS is thus informed of the IMSI identifier of the terminal that is registering.

The SCC-AS then has at its disposal, in the registration context of the terminal that has just registered, all of the terminal's non-barred public identities, the contact address of the terminal, and its IMSI identifier.

It will be noted that the registration procedures just described for the eSRVCC and SRVCC procedures are in particular applicable in the case of a multi-terminal configuration.

During the establishment of a session between two users, as described in step 1 of FIGS. 1 and 2b, and prior to the receipt of an access transfer request, the SCC-AS and the ATCF will therefore be in a position to determine which one, from among the plurality of terminals of each of the, calling and called, users, is used to establish this session. Indeed, the information stored in the registration contexts of the ATCF and of the SCC-AS enables the association to be made between the contact addresses of each of the terminals, their respective IMSI identifiers and the public identities used for establishing this session.

We shall explain now, within the framework of the application of the invention to the handover of a communication from an LTE network connected to an IMS network to a GSM or UMTS network connected to the same IMS network, the way in which a change of mobile network happens for one of these terminals.

The procedure which occurs in the mobile core network ("Evolved Packet Core", or EPC) during an access transfer is described in 3GPP specifications TS 23.401 and TS 29.280. As mentioned hereinabove, this procedure comprises in particular the handover of the communication from an MME management center of the LTE network to an MSC management center of the GSM or UMTS network. According to Table 5.2.2 of said specification TS 29.280, the information which is transmitted to the MSC management center during handover comprises in particular the IMSI identifier of the terminal concerned.

However, in the prior art, this IMSI identifier is not transmitted by the MSC management center to the IMS core network (ATCF or SCC-AS) (cf. SIP INVITE request in step 4 of FIG. 1, or in step 3 of FIG. 2b).

According to the present application of the invention, the MSC management center uses the "P-Associated-IMSI" SIP header (or the "Restoration-Info" SIP header) in order to dispatch to the IMS core network the IMSI identifier (obtained in accordance with specification TS 29.280) relating to the terminal forming the subject of an access transfer. This item of information is then utilized jointly with the MSISDN telephone number, either by the SCC-AS following the receipt of the INVITE request in step 6 of FIG. 1 in the case of an SRVCC procedure, or by the ATCF following the receipt of the SIP INVITE request in step 3 of FIG. 2b in the case of an eSRVCC procedure.

In the case of the first embodiment of the invention (modified eSRVCC procedure), the ATCF then completes the user context initialized following the receipt of the SIP 200 OK response during step 14 of FIG. 3. As the ATCF has previously stored the correspondence between the IMSI identifier and the contact address of each of the user's terminals, the ATCF is in a position to unambiguously determine the terminal concerned in the access transfer procedure.

In the case of the second embodiment of the invention (modified SRVCC procedure), the IMSI identifier is used by the SCC-AS to complete the user context initialized following the receipt of the SIP REGISTER registration request (step equivalent to step 17 of FIG. 3). As the SCC-AS has previously stored the correspondence between the IMSI identifier and the contact address of each of the user's terminals, the SCC-AS is in a position to unambiguously determine the terminal concerned in the access transfer procedure.

It will be noted that the present invention can be implemented within the nodes of an IP network, for example the registration servers or the access transfer control entities, by means of software components and/or hardware components, such as electronic circuits.

The software components will be able to be integrated into a conventional computer program for network node management. This is why, as indicated hereinabove, the present invention also relates to a computing system. This computing system comprises in a conventional manner a central processing unit controlling by signals a memory, as well as an input unit and an output unit. Moreover, this computing system can be used to execute a computer program comprising instructions for the implementation of any one of the methods for changing mobile network according to the invention.

Indeed, the invention also envisages a computer program downloadable from a communication network comprising instructions for the execution of the steps of a method for changing mobile network according to the invention, when it is executed on a computer. This computer program can be stored on a medium readable by computer and can be executable by a microprocessor.

This program can use any programming language, and take the form of source code, object code, or of code intermediate between source code and object code, such as in a partially compiled form, or in any other desirable form.

The invention also envisages an irremovable, or partially or totally removable, information medium readable by a computer, and comprising instructions of a computer program such as is mentioned hereinabove.

The information medium can be any entity or device capable of storing the program. For example, the medium can comprise a storage means, such as a ROM, for example a CD ROM or a microelectronic circuit ROM, or a magnetic recording means, such as a hard disk, or else a USB key ("USB flash drive" in English).

Moreover, the information medium can be a transmissible medium such as an electrical or optical signal, which can be conveyed via an electrical or optical cable, by radio or by other means. The computer program according to the invention can be in particular downloaded over a network of Internet type.

As a variant, the information medium can be an integrated circuit in which the program is incorporated, the circuit being adapted to execute or to be used in the execution of any one of the methods for changing mobile network according to the invention.

The invention claimed is:

1. A method of switching between mobile networks, the method comprising:
receiving, by a registration server of an Internet Protocol (IP) network in charge of a terminal, a registration request sent by the terminal to register with the IP network, and obtaining an International Mobile Subscriber Identity (IMSI) identifier of the terminal registering with the IP network,
inserting, by the registration server, the IMSI identifier in a response to the registration request or in the registration request, and forward therein the IMSI identifier to an access transfer control entity of the IP network, after detection of a need to switch a communication in which the terminal participates from a first mobile network connected to the IP network to a second mobile network connected to the same IP network, transmission by a first management center belonging to the first mobile network to a second management center belonging to the second mobile network of the IMSI identifier of the terminal, sending, by the second management center, the IMSI identifier to the IP network, receiving, by the access transfer control entity, a request for change of mobile network containing the IMSI identifier, and identifying, by the access transfer control entity, a contact address of the terminal by means of the IMSI identifier.

2. The method of claim 1, wherein after having obtained the IMSI identifier, the registration server forwards the IMSI identifier in the registration request to a Service Centralization and Continuity (SCC-AS) entity.

3. The method of claim 2, wherein after having received IMSI identifier, the SCC-AS entity transmits the IMSI identifier to an Access Transfer Control Function (ATCF) entity.

4. The method of claim 1, wherein after having obtained the IMSI identifier, the registration server forwards the IMSI identifier in the response to the registration request to an Access Transfer Control Function (ATCF) entity.

5. A registration server in an IP (Internet Protocol) network, the registration server being configured to:
   receive a registration request to register with the IP network sent by a terminal under the charge of the registration server,
   obtain an International Mobile Subscriber Identity (IMSI) identifier of the terminal registering with the IP network,
   insert the IMSI identifier in a response to the registration request or in the registration request, and forward therein the IMSI identifier to an access transfer control entity of the IP network.

6. An access transfer control entity in an IP (Internet Protocol) network, the access transfer control entity including a Service Centralization and Continuity Application Server (SCC-AS) entity, and configured to:
   receive in a registration request an International Mobile Subscriber Identity (IMSI) identifier of a terminal from a registration server in charge of the terminal, wherein the registration request was received by the registration server from the terminal to register with the IP network and forwarded by the registration server to the SCC-AS entity after having inserted therein the IMSI identifier; and
   register the received IMSI identifier of the terminal.

7. The access transfer control entity of claim 6, wherein the access transfer control entity is further configured to transmit the received IMSI identifier of the terminal to an Access Transfer Control Function (ATCF) entity.

8. An access transfer control entity in an IP (Internet Protocol) network, the access transfer control entity including an Access Transfer Control Function (ATCF) entity, and configured to:
   receive an International Mobile Subscriber Identity (IMSI) identifier of a terminal:
   from a registration server in charge of the terminal, the IMSI identifier being sent by the registration server to the access transfer control entity during registration with the IP network of the terminal in a response to a registration request received by the registration server from the terminal to register with the IP network, or
   from a Service Centralization and Continuity Application Server (SCC-AS) entity to which the registration server in charge of the terminal sent in the registration request the IMSI identifier during registration of the terminal with the IP network, the registration request received by the registration server from the terminal being forwarded by the registration server to the SCC-AS entity after having inserted therein the IMSI identifier; and
   register the received IMSI identifier of the terminal.

9. The access transfer control entity of claim 6, wherein the access transfer control entity is further configured to:
   receive a request for change of mobile network relating to the terminal, the request containing the IMSI identifier of the terminal, and identify a contact address of the terminal by means of the IMSI identifier.

10. A communication system in an IP (Internet Protocol) network, comprising:
    the registration server of claim 5, and
    an access transfer control entity including a Service Centralization and Continuity Application Server (SCC-AS) entity, and configured to:
       receive an International Mobile Subscriber Identity (IMSI) identifier of a terminal from the registration server, said registration server being configured to send the IMS identifier of the terminal to the access transfer control entity during registration with the IP network of the terminal in a registration request received by the registration server from the terminal to register to the IP network and forwarded to the access transfer control entity by the registration server after having inserted the IMSI identifier therein; and
       register the received IMSI identifier of the terminal.

11. The access transfer control entity of claim 8, wherein the access transfer control entity is further configured to:
    receive a request for change of mobile network relating to the terminal, the request containing the IMSI identifier of the terminal, and
    identify a contact address of the terminal by means of said IMSI identifier.

12. A communication system in an IP (Internet Protocol) network, comprising:
    the registration server of claim 5, and
    an access transfer control entity including an Access Transfer Control Function (ATCF) entity, and configured to:
       receive an International Mobile Subscriber Identity (IMSI) identifier of a terminal from the registration server, the registration server being configured to send the IMSI identifier of the terminal to the access transfer control entity during registration with the IP network of the terminal in a response to a registration request received by the registration server from the terminal to register to the IP network, or from a Service Centralization and Continuity (SCC-AS) entity which received the IMSI identifier from the registration server in the registration request, and register the IMSI identifier of the terminal.

* * * * *